3,578,656
METHOD OF MAKING ALLANTOIN POLY-GALACTURONIC ACID COMPOUNDS
Sebastian B. Mecca, Abington, Pa., assignor to Schuylkill Chemical Company, Philadelphia, Pa.
No Drawing. Filed Feb. 24, 1969, Ser. No. 801,763
Int. Cl. C07c 95/04
U.S. Cl. 260—209　　　　　　　　　　　　　8 Claims

ABSTRACT OF THE DISCLOSURE

Allantoin polygalacturonic acid compounds are prepared by dissolving a salt of allantoin and a salt of polygalacturonic acid in water containing a base, lowering the pH of the resulting solution with an acid or an aluminum salt to precipitate allantoin polygalacturonic acid when an acid is used or aluminum allantoin polygalacturonate when an aluminum salt is used, and recovering the precipitate.

BACKGROUND OF THE INVTNTION

Allantoin polygalacturonic acid and its aluminum derivative, aluminum allantoin polygalacturonate, are known compounds, combining the detoxifying, skin smoothening and circulation stimulating activity of polygalacturonic acid with the anti-irritant, moisturizing, keratolytic and healing properties of allantoin and aluminum allantoinate ("A New Series of Novel Allantoin Complexes for Topical Use," by Lubowe et al., Proceedings of the Scientific Section of the Toilet Goods Association, No. 42, pages 6–8, December 1964; British Pat. 1,091,179, and Riechstoffe·Aromen Körperpflegemittel, vol. 18, No. 10, page 441, October 1968). The compounds are used in cosmetic and other dermatological preparations for topical application.

Prior to the present invention, the stated compounds have been prepared by a method which involves the high speed trituration of a mixture of finely-divided allantoin (or aluminum allantoinate) and finely-divided polygalacturonic acid with sufficient boiling water added to form a damp paste, followed by drying (British Pat. No. 1,091,179). There has been some question whether this procedure insures complete reaction of the materials.

It is the principal object of the present invention to provide a novel method of preparing the stated allantoin polygalacturonic acid compounds whereby the desired compound is precipitated out of solution as a pure product.

Other objects will become apparent from a consideration of the following specification and claims.

SUMMARY OF THE INVENTION

The method of the present invention comprises dissolving a sodium, potassium or ammonium salt of allantoin and a sodium, potassium or ammonium salt of polygalacturonic acid in water containing sodium hydroxide, potassium hydroxide or ammonium hydroxide; lowering the pH of the resulting solution to precipitate the desired allantoin polygalacturonic acid compound, and recovering the precipitate. When the desired compound is allantoin polygalacturonic acid itself, the pH is lowered, for precipitation, with an acid, and when the desired compound is aluminum allantoin polygalacturonate, the pH is lowered with a soluble aluminum salt.

The present method provides for complete dissolution of each of the reactants to form a solution in which there is little if any undissolved reactant and in which, at least initially and before lowering the pH, there is no precipitated product. The pH of the solution is then adjusted to cause precipitation of the desired compound in pure form thereby insuring completion of reaction and the production of a uniform product from batch to batch.

The principal reactants in carrying out the present method are, of course, allantoin and polygalacturonic acid. However, since these compounds possess only very low solubility in water, they must be converted to simple water-soluble salts, namely the sodium-, potassium- or ammonium salts. Although the stated salts of either or both of the allantoin and polygalacturonic acid could be prepared separately and added as such to the reaction medium, it is preferred simply to add the allantoin and polygalacturonic acid to water containing sodium hydroxide, potassium hydroxide or ammonium hydroxide thereby forming the salt of allantoin and the salt of polygalacturonic acid in situ and which immediately dissolve in the reaction medium. The aqueous medium after the allantoin salt and polygalacturonic acid salt have been dissolved therein should be alkaline, that is, have a pH above 7. Hence, when the salts are formed in situ, the alkaline solution to which the allantoin and polygalacturonic acid are added will contain sodium hydroxide, potassium hydroxide or ammonium hydroxide in excess of that required to form the salts. Preferably such alkaline solution will not have a concentration of sodium hydroxide over about 8%, or a concentration of potassium hydroxide over about 10%, or a concentration of ammonium hydroxide over about 20%, more especially not over about 15%.

The reaction involves 1 mol of allantoin and 1 mol of polygalacturonic acid, and hence the reactants will be used in an approximately 1:1 molar ratio.

The amount of water is not critical so long as the stated salts are dissolved and, upon subsequent precipitation of the desired product, a fluid suspension—easily handled as for filtering, decanting, centrifuging, or the like—is provided.

The temperature also is not critical, but, unlike the previous method for making the compounds, boiling water is neither required nor desirable. Preferably, the temperature of the reaction medium is not over 30° C., and may even approach the freezing point. Ordinary tap water or water at about room temperature are entirely satisfactory, and are preferred.

The next main step of the present method is to lower the pH of the solution to precipitate the desired allantoin polygalacturonic acid compound. The particular reagents and pH conditions, as well as specific procedural techniques, employed will depend upon the particular product, namely allantoin polygalacturonic acid or aluminum allantoin polygalacturonate, desired.

If the desired product is allantion polygalacturonic acid, the pH is lowered to below about 7, and preferably to within the range of from about 5 to about 6.5, with a simple soluble acid, like hydrochloric acid, sulfuric acid, acetic acid, lactic acid, and the like. The allantion polygalacturonic acid precipitates quantitatively in relatively pure form.

If the desired product is aluminum allantion polygalacturonate, the pH is lowered to below about 7, and preferably not below 6, with a soluble aluminum salt, like aluminum chloride, aluminum sulfate, and the like. Sufficient aluminum salt will be added to supply the atom of aluminum for each molecule of allantoin and of polygalacturonic acid. The aluminum allantoin polygalacturonate precipitates quantitatively in relatively pure form. Preferably, the pH of the mixture is then adjusted to from about 7 to about 8 with sodium hydroxide, potassium hydroxide or ammonium hydroxide.

The allantoin polygalacturonic acid or aluminum allantoin polygalacturonate precipitate is readily recovered from the reaction mixture as by filtering, decanting, centrifuging, or the like; washed with water and finally dried, preferably at an elevated temperature of from about 150 to about 190° F.

The invention will be more readily understood from the following specific examples which are given for the purpose of illustration only and are not to be considered as limiting the scope of the invention in any way.

EXAMPLE 1

Two hundred and eight grams of polygalacturonic acid (using a material assaying 85% anhydrogalacturonic acid, molecular weight 176) and 170 g. of allantoin are dissolved in 2000 cc. of an 8% aqueous solution of sodium hydroxide at room temperature. The solution is neutralized to a pH of 6.5 with aqueous hydrochloric acid. The resulting precipitate is filtered off, washed with distilled water until free of chlorides and dried at 160 to 180° F. The product is allantoin polygalacturonic acid in the form of a powder, having a melting point with decomposition, at 190–200° C. and a purity of 98% (balance moisture). The yield is 95–97% of theory.

EXAMPLE 2

The procedure of Example 1 is followed except that a 10% aqueous solution of potassium hydroxide is used instead of the sodium hydroxide, and the solution is neutralized with a 25% aqueous solution of sulfuric acid instead of hydrochloric acid.

EXAMPLE 3

The procedure of Example 1 is followed except that a 10% aqueous solution of ammonium hydroxide is used instead of the sodium hydroxide, and the solution is neutralized with a 36% aqueous solution of acetic acid instead of hydrochloric acid.

EXAMPLE 4

Polygalacturonic acid (20.8 g.) and 17 g. of allantoin are dissolved in 500 cc. of a 3% aqueous solution of sodium hydroxide at room temperature. To this solution is added, with constant stirring, a solution of 25 g. aluminum chloride in 500 cc. of distilled water. The pH of the resulting mixture is adjusted to 7 with 0.1 N aqueous sodium hydroxide solution, and the mixture is stirred for an additional 4 hours. The precipitate is then allowed to settle and is washed three times by decantation. The precipitate is collected and dried to provide aluminum allantoin polygalacturonate as a yellowish powder, having a purity of 98% (balance moisture). The yield is 90–93% of theory.

EXAMPLE 5

Polygalacturonic acid (20.8 g.) and 17 g. of allantoin are dissolved in 500 cc. of a 5% aqueous solution of potassium hydroxide at room temperature. To this solution is added, with constant stirring, a solution of 34 g. aluminum sulfate in 500 cc. distilled water. The pH of the resulting mixture is adjusted to 7 with 5% aqueous potassium hydroxide solution, and the product otherwise worked up as in Example 4.

EXAMPLE 6

The procedure of Example 4 is followed except that the base used for dissolving the reactants and for adjusting the pH of the mixture to 7 is a 5% aqueous ammonium hydroxide solution.

Modification is possible in the selection of reagents and in the procedural techniques employed without departing from the scope of the present invention.

I claim:

1. The method of making allantoin polygalacturonic acid compounds which comprises dissolving a sodium, potassium or ammonium salt of allantoin and a sodium, potassium, or ammonium salt of polygalacturonic acid, in water containing sodium hydroxide, potassium hydroxide or ammonium hydroxide; lowering the pH of the resulting solution to precipitate the desired allantoin polygalacturonic acid compound, and recovering the precipitate.

2. The method of claim 1 wherein allantoin and polygalacturonic acid are added to water containing sodium hydroxide, potassium hydroxide or ammonium hydroxide, in an amount in excess of that required to form said salt of allantoin and said salt of polygalacturonic acid.

3. The method of claim 2 wherein the pH of the resulting solution is lowered to below about 7 with an acid whereby allantoin polygalacturonic acid precipitates.

4. The method of claim 3 wherein the pH of the solution is lowered to a pH of from about 5 to about 6.5.

5. The method of claim 4 wherein said acid is hydrochloric, sulfuric, or acetic acid.

6. The method of claim 2 wherein the pH of the resulting solution is lowered to below 7 with a water-soluble aluminum salt whereby aluminum allantoin polygalacturonate precipitates.

7. The method of claim 6 wherein said aluminum salt is aluminum chloride or aluminum sulfate.

8. The method of claim 6 wherein, after the pH has been lowered to below 7 with said aluminum salt, the pH is adjusted to from about 7 to about 8 with sodium hydroxide, potassium hydroxide or ammonium hydroxide.

References Cited

UNITED STATES PATENTS

| | | | |
|---|---|---|---|
| 2,871,236 | 1/1959 | Bryant | 260—209 |
| 3,209,010 | 9/1965 | Gaguardi et al. | 260—309.7 |
| 3,350,363 | 10/1967 | Hurwitz | 260—309.7 |

OTHER REFERENCES

Lubowe, "Chem. Abst," vol. 63, 1965, pp. 4096(h)–4097(a).

LEWIS GOTTS, Primary Examiner

J. R. BROWN, Assistant Examiner